Oct. 25, 1966 R. J. SCHWARTZ 3,281,832

DIGITAL TO ANALOG CONVERSION APPARATUS

Filed Sept. 23, 1964

INVENTOR.
ROBERT J. SCHWARTZ

BY

Brumbaugh, Free, Graves & Donohue his ATTORNEYS

United States Patent Office 3,281,832

Patented Oct. 25, 1966

3,281,832

DIGITAL TO ANALOG CONVERSION APPARATUS

Robert J. Schwartz, Houston, Tex., assignor to Schlumberger Well Surveying Corporation, Houston, Tex., a corporation of Texas Filed Sept. 23, 1964, Ser. No. 398,576
7 Claims. (Cl. 340—347)

Figure 1:
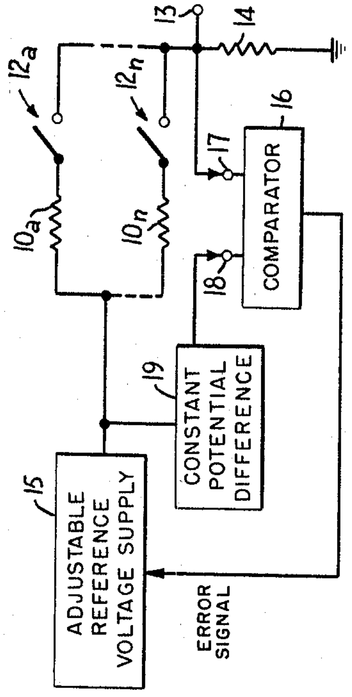

This invention relates to apparatus for converting digital data into analog form and, more particularly, to a digital to analog conversion apparatus wherein the analog output signal remains linear over a relatively wide range of output voltage levels.

Various mechanical and electronic techniques have been devised for converting the digital output of computing machinery into analog form to facilitate interpretation of results. In one well-known type of digital to analog converter for converting a multi-bit digital "word" to a voltage level, a fixed reference voltage is applied to one end of each of a plurality of adding resistors, the other ends of which are connected to a common output summing resistor through individual switching means respectively activated in accordance with the several bits of the digital word to be converted. The resistance values of the adding resistors are related to each other by successive powers of two (for a binary system) and thus the analog currents corresponding to the selected binary digits that are supplied to the summing resistor supposedly are similarly related. These currents flowing through the summing resistor generate the voltage whose magnitude represents the analog value of the binary word being converted.

In practice, however, the non-linearity of such prior art converters renders them limited in application. The current supplied by each adding resistor depends upon the voltage across the resistor, which voltage is the difference between the fixed reference voltage and the voltage at the summing resistor. However, the latter increases as more adding resistors are connected to supply analog currents to the summing resistor. This in turn decreases the voltage across the adding resistors, causing a proportional reduction in the magnitudes of the currents supplied by the adding resistors. Therefore, as more analog currents are summed, the individual currents, as well as their summation, increasingly depart from their desired values. From a practical standpoint, the resultant non-linearity limits the maximum output voltage of conventional converters to a relatively small value in comparison with the reference voltage. For example, if the output of such a converter is required to be within 1% of the desired linear characteristic, the maximum output voltage may not exceed 1% of the reference voltage. Accordingly, where substantial linearity is required, substantial amplification is necessary.

It is the primary object of the present invention to provide a novel and improved apparatus for converting digital data into analog form which avoids the shortcomings of prior art techniques.

A further object of the invention is to provide an improved apparatus for the conversion of digital data into analog form in a linear fashion, wherein relatively high output levels may be attained.

In accordance with the present invention, these and other objects and advantages are attained in converters of the type described above by maintaining the potential difference across the adding resistors at a constant value, so that the current supplied by each selected adding resistor is constant, regardless of the value of the output voltage at the summing resistor. In particular, the reference voltage is provided by a "floating" power supply which is adjusted to maintain a constant difference in potential between the reference voltage and the output voltage. Thus, as the output voltage varies with the selection of specific adding resistors in accordance with a given binary word, the reference voltage is automatically varied by the same degree. The proper value of the reference voltage is attained by comparing the difference in potential between the reference voltage and the output voltage with a desired constant value, and then adjusting the reference voltage until this potential difference equals the desired constant value.

Figure 2:
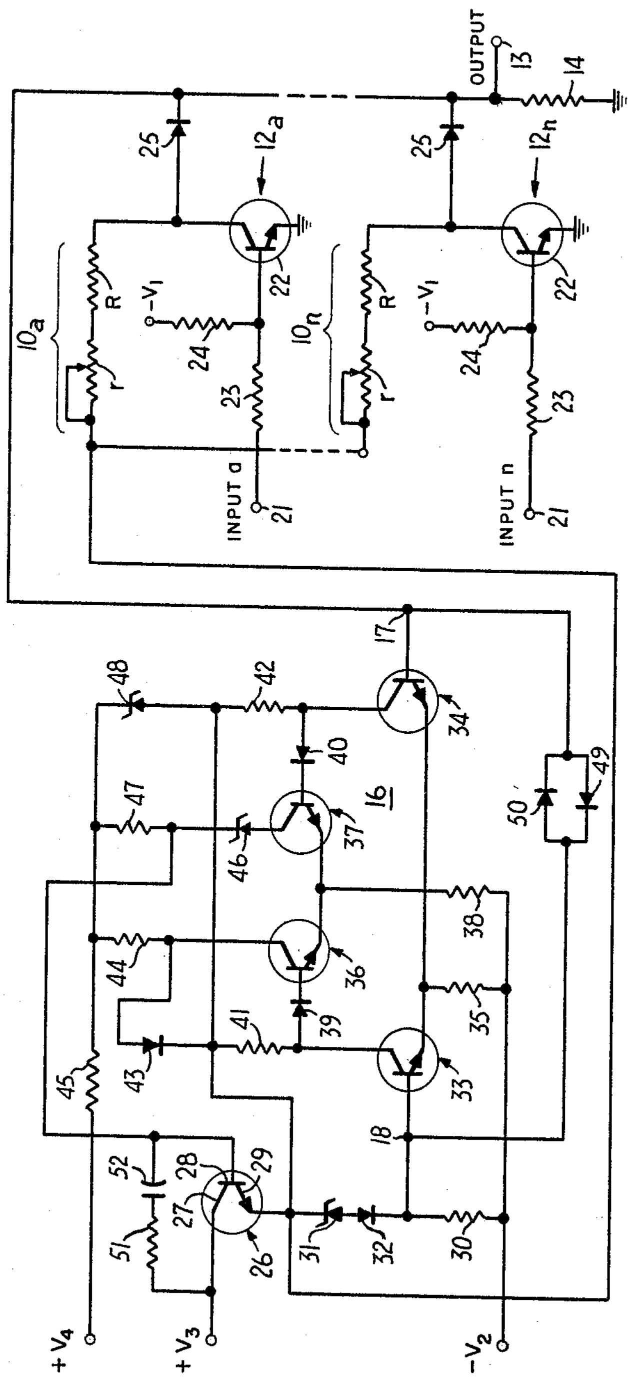

All of the above is more fully explained with the detailed description of a preferred form of the invention which follows, this description being illustrated by the accompanying drawings wherein:

FIG. 1 is a block diagram, partially in simplified schematic form, of a digital to analog converter embodying the invention; and FIG. 2 is a schematic diagram of a complete electrical circuit in accordance with the invention.

Referring now to the block diagram of the invention shown in FIG. 1, a plurality of adding resistors represented by elements $10_a \ldots 10_n$ are connected at one end through respective switches $12_a \ldots 12_n$ to an output terminal 13, to which terminal is also coupled one end of a summing resistor 14. It will be understood that any desired number of adding resistors and associated switches may be used. The other end of the summing resistor is connected to a reference potential, such as electrical ground. An adjustable reference voltage supply 15 supplies a reference voltage to the other ends of the resistors $10_a \ldots 10_n$, remote from the switches $12_a \ldots 12_n$. Upon application of a digital signal to control the switches $12_a \ldots 12_n$, specific adding resistors are selected to supply amounts of current to the summing resistor 14 in accordance with the values of the selected adding resistors. In a binary system, where the digital signal is in the form of a multi-bit binary word, the relationship between the values of the adding resistors $10_a \ldots 10_n$ is based upon powers of two, such that each adding resistor will supply an increment of current higher by a power of two than the next lower order resistor. The switches $12_a \ldots 12_n$ of the converter, for example, may be controlled by a counter comprising a plurality of cascaded flip-flop storage stages (not shown) containing the binary word to be converted, whereby the converter provides an output voltage proportional to the stored pulse count. Such an arrangement is shown in U.S. Patent No. 3,093,811, granted June 11, 1963, for "Well Logging Systems" and assigned to the present assignee.

A constant potential across the adding resistors is maintained by means of a comparator 16 having a first input terminal 17 connected to the end of the summing resistor 14 remote from ground and a second input terminal 18 connected through a source of constant potential difference 19 to the output of the adjustable reference voltage supply 15. The comparator 16 is preferably designed for input signal current that is small compared with the lowest analog current increment, i.e., the current drain by the comparator is negligible relative to the smallest increment of current supplied by the adding resistors. The output of the comparator 16 is fed to the reference supply voltage 15 to adjust the magnitude of the reference voltage applied to the adding resistors in a direction to reduce the difference in magnitude between the signals applied to the input terminals 17 and 18. Consequently, as the output voltage appearing across the summing resistor 14 increases, for example, the comparator 16 generates an error signal which raises the reference voltage provided by the source 15, thereby tending to restore the balance. Inasmuch as the input signal to the terminal 18 always differs from the output of the reference voltage supply 15 by a constant value (the value generated by the supply 19), the reference voltage supply 15 is automatically adjusted so that the potential difference across the adding resistors (and the switches) is maintained at the value generated by the constant supply 19. In this way, each adding resistor connected to the summing resistor supplies the correct analog value of current regardless of the level of the output voltage across the resistor 14, thus providing a linear relationship over a wide range of voltage values.

Referring now to the schematic electrical diagram of FIG. 2, each of the switches $\mathbf{12_a} \ldots \mathbf{12_n}$ includes an input terminal 21, a transistor 22, resistors 23 and 24, and a diode 25. Each of the adding resistors $\mathbf{10_a} \ldots \mathbf{10_n}$ comprises a fixed resistor R and a variable resistor $r$, the latter being adjusted so that the total resistance $R+r$, together with the forward resistance of the diode 25, which is dependent upon the value of current flowing therethrough, is the exact value necessary to provide the desired analog current. The terminal 21 is coupled to the digital input device, e.g., a flip-flop storage stage, containing a binary digit, whereby the transistor 22 is rendered conductive or non-conductive in accordance with the value of the binary digit. For example, a binary "1" may be represented by a more negative voltage level, maintaining the transistor 22 non-conductive, and a binary "0" by a more positive voltage level sufficient to render the transistor conductive. When the transistor 22 is conductive (binary "0"), the diode 25 is non-conductive (the potential of the collector of the transistor 22 being lower than a value equaling the potential of the output terminal 13 plus the forward voltage drop of diode 25 when conducting) and so the adding resistor 10 is disconnected from the summing resistor 14, whereas rendering the transistor 22 non-conductive (binary "1") connects the adding resistor 10 with the summing resistor and provides an increment of current thereto.

The adjustable reference voltage supply 15 shown in block form in FIG. 1 comprises an emitter follower circuit including a transistor 26, having a collector 27, a base 28 and an emitter 29, and an emitter resistor 30 connected to the emitter through a Zener diode 31 and a diode 32 whose functions will be discussed below. The collector 27 and the end of the resistor 30 remote from the transistor 26 are connected to positive and negative reference potentials in a conventional manner. The output of the adjustable reference voltage supply 15 appears at the emitter 29 and is connected directly to the adding resistors $\mathbf{10_a} \ldots \mathbf{10_n}$. The Zener diode 31 and the diode 32 comprise the source of constant potential difference 19 connected between the adjustable reference supply 15 and the input 18 to the comparator 16. The operation of the Zener diode to provide a constant potential difference in its reverse conducting mode is well-known to the art and requires no detailed explanation. The diode 32 provides temperature compensation for the diodes 25.

The comparator 16 includes a pair of cascaded differential amplifier stages, the first differential amplifier stage including a pair of transistors 33 and 34 whose emitters are connected through a common resistor 35 to a reference potential. The second differential amplifier stage is made up of a pair of transistors 36 and 37 whose emitters are connected through a common resistor 38 to the same reference potential. The input from the summing resistor 14 is coupled to the terminal 17 of the comparator 16 at the base of the transistor 34, and the input from the constant potential difference supply 19 (i.e., from the side of the diode 32 remote from the transistor 26) is applied to the base of the transistor 33. The collectors of the transistors 33 and 34 are connected through a pair of diodes 39 and 40 respectively to the bases of the transistors 36 and 37 respectively and through a pair of resistors 41 and 42 respectively to the emitter 29 of the transistor 26. The collector of the transistor 36 is connected through a diode 43 to the emitter 29 and through a resistor 44 to a resistor 45 and thence to a reference potential source. The collector of the transistor 37 is connected through a Zener diode 46 to the base 28 of the transistor 26 and through resistors 47 and 45 to the same reference source as the collector of transistor 36. A Zener diode 48 is connected between the ends of the resistors 44 and 47 remote from the transistors 36 and 37 and the corresponding ends of the resistors 41 and 42. Two diodes 49 and 50 are cross-coupled in opposite polarity between the bases of the transistors 33 and 34 for reasons to be explained presently.

In operation, the potential appearing at the output terminal 13 is applied to the input terminal 17 of the comparator 16 (i.e., to the base of the transistor 34), and a potential is applied to the terminal 18 equal to the reference voltage supplied from the emitter 29 to the adding resistors $\mathbf{10_a} \ldots \mathbf{10_n}$ minus the voltage drop across the Zener diode 31 and the diode 32. The potential difference between the signals applied to the terminals 17 and 18 appears in amplified form as the difference in potential between the collectors of the transistors 33 and 34, which comprise a first differential amplifier stage, in a manner well-known to those skilled in the art. The differential amplifier stage thus generates an error signal (which appears between the collectors of the transistors 33 and 34) in accordance with the difference of potential between the signals applied to the input terminals 17 and 18.

The error signal thus generated is applied through the diodes 39 and 40 to an error amplifier or second differential amplifier stage including the transistors 36 and 37 to provide current gain for the error signal. The output of this second differential amplifier stage, which appears between the collectors of the last-named transistors, is applied through the Zener diode 46 to the base 28 of the emitter follower transistor 26 in the adjustable reference voltage supply 15. Diode 43 provides a clamping action to maintain the output swing within limits. Furthermore, the diodes 43 and 46 protect the transistors 36 and 37 from voltage breakdown in the event of substantial unbalance of inputs. In this way the operation of the emitter follower 26 is adjusted to vary the reference voltage applied to the adding resistors until the potentials applied to the bases of the transistors 33 and 34 become equal. In this condition, the potential difference across the adding resistors $\mathbf{10_a} \ldots \mathbf{10_n}$ (and the diodes 25) equals the constant value of potential difference across the Zener diode 31 (and the diode 32). Thus, the potential difference across the adding resistors is maintained at a constant value regardless of the magnitude of the voltage across the summing resistor 14.

During the normal operation of the converter, the potentials appearing at the input terminals 17 and 18 are maintained within a few millivolts of each other, so that the diodes 49 and 50 are non-conductive. These diodes prevent the differential amplifier from latching, which might otherwise occur when power is first applied to the circuit and the potential of one side is very much lower than at the other side. The provision of the cross-coupled diodes 49 and 50 prevents such latching, inasmuch as the diode of appropriate polarity would go into conduction to hold the potential difference of the inputs to within 0.6 volt, for example. Similarly, the diodes 39 and 40 have a protective role, preventing breakdown of the transistors 36 and 37, respectively, should related excessive voltages occur across the junctions thereof.

The Zener diode 48 assures that the supply voltage for the transistors 36 and 37 (i.e., the potential of the ends of the resistors 44 and 47 remote from these transistors) is greater than the reference voltage supplied by the emitter 29 (the supply voltage for the transistors 33 and 34) by a constant amount. In this regard, the design of the comparator 16 is such that the operating condition of each differential amplifier stage changes very little over the entire range of output levels at the terminal 13 (and therefore at the terminal 17). This condition obtains because the reference voltage supplied by the emitter 29, which is also the supply voltage for the transistors 33 and 34, follows exactly the variations of the output voltage across the summing resistor 14, the constant potential difference across the adding resistors (and the diodes 25) being maintained therebetween. Similarly, the diode 48 maintains a constant potential difference between the reference voltage and the supply voltage for the transistors 36 and 37. To further maintain a more constant operating condition for the transistors 33, 34, 36 and 37, the emitter resistors 35 and 38 could each be returned through a Zener diode to the junction of the diode 32 and the resistor 30.

The Zener diode 46 is provided to couple the amplified error signal output of transistor 37 to the base 28 of transistor 26 and at the same time to protect transistor 37 against excessive collector-to-emitter voltage. The constant voltage drop across the Zener 46 serves to prevent excess collector-to-emitter voltage across transistor 37 from damaging the transistor.

While the fundamental novel features of the invention have been shown and described, it will be understood that various substitutions, changes and modifications in the form and details of the apparatus illustrated may be made by those skilled in the art without departing from the spirit and scope of the invention. For example, other suitable adjustable reference voltage supplies could be substituted for the emitter follower circuit illustrated. Similarly, the source of constant potential difference provided by the Zener diode 31 could be supplied by other suitable means well known to those skilled in the art. All such variations and modifications, therefore, are included within the intended scope of the invention as defined by the following claims.

I claim:

1. Apparatus for converting digital data into analog form comprising, a plurality of resistors having respective values related in accordance with the weights of the individual bits of the digital word to be applied thereto, an output impedance element, respective switch means selectively coupling one end of each of said resistors to one terminal of said output impedance element, the other terminal thereof being connected to a source of reference potential, a variable potential source coupled in common to the other ends of said resistors, and means coupled between said output impedance element and said variable potential source to adjust said source in response to a change in potential across said output impedance element to maintain a constant potential across said resistors.

2. Apparatus for converting digital data into analog form comprising, a plurality of resistors having respective values related in accordance with the weights of the individual bits of the digital word to be applied thereto, an output impedance element, respective switch means selectively coupling one end of each of said resistors to one terminal of said output impedance element, the other terminal thereof being connected to a source of reference potential, a variable potential source coupled in common to the other ends of said resistors, a constant potential source having one terminal connected in common to the other ends of said resistors, circuit means for comparing two input voltages and providing an output proportional to their difference, means connecting the other terminal of said constant source to one input of said comparing circuit means and said one terminal of said output impedance element to the other input thereof, and means coupling the output of said comparing circuit means to said variable source for adjusting the latter in a direction to reduce the output of said comparing circuit means.

3. Apparatus for converting digital data into analog form comprising, a summing resistor, one end of said summing resistor being connected to an output terminal and the other end of said summing resistor being adapted to be connected to a reference potential, a plurality of adding resistors, a plurality of switch means responsive to the digital data for selectively coupling one end of each of said adding resistors to said one end of said summing resistor, adjustable means for supplying a reference voltage to the other end of said adding resistors, and differential amplifier means coupled to the output of said reference voltage supplying means and to said one end of said summing resistor for adjusting said reference voltage supplying means so as to maintain a constant potential difference between said other end of said adding resistors and said one end of said summing resistor.

4. Apparatus for converting digital data into analog form comprising, a summing resistor, one end of said summing resistor being adapted to be connected to an output terminal and the other end being adapted to be connected to a reference potential, a plurality of adding resistors, a plurality of switch means responsive to the digital data for selectively coupling one end of each of said adding resistors to said one end of said summing resistor, adjustable means for supplying a reference voltage to the other end of said adding resistors, and differential amplifier means for comparing the potential difference across said adding resistors with a desired constant value of potential difference and for adjusting said reference voltage supplying means so as to maintain the potential difference across said adding resistors at the desired constant value.

5. Apparatus according to claim 4 wherein said differential amplifier means has two inputs, and further including means for generating the desired constant value of potential difference connected between said other end of said adding resistors and one of said two inputs, the other of said two inputs being connected to said one end of said summing resistor.

6. In apparatus for converting digital data into analog form including a summing resistor, one end of said summing resistor being adapted to be connected to an output terminal and the other end being adapted to be connected to a first reference potential, a plurality of adding resistors, and a plurality of switch means responsive to the digital data for selectively coupling one end of each of said adding resistors to said one end of said summing resistor, the combination therewith of differential amplifier means having first and second input terminals and an output terminal, said first input terminal being connected to said one end of said summing resistor, a transistor having a collector, a base and an emitter, said collector being adapted to be connected to a second reference potential, said base being connected to said output terminal of said differential amplifier means, an emitter resistor adapted to be connected at one end to a third reference potential, and means for generating a constant value of potential difference connected between the other end of said emitter resistor and said emitter, the other end of said emitter resistor also being connected to said second input terminal.

7. Apparatus according to claim 6 wherein said means for generating a constant value of potential difference comprises a Zener diode.

No references cited.

MAYNARD R. WILBUR, *Primary Examiner.*

W. J. KOPACZ, *Assistant Examiner.*